(12) United States Patent
Richardson

(10) Patent No.: US 6,971,693 B1
(45) Date of Patent: Dec. 6, 2005

(54) REMOVABLE VEHICLE DOOR PROTECTOR

(76) Inventor: Rodney L. Richardson, 4700 NW. 178th Ter., Miami, FL (US) 33055

( * ) Notice: Subject to any disclaimer, the term of this patent is extended or adjusted under 35 U.S.C. 154(b) by 59 days.

(21) Appl. No.: 10/822,245

(22) Filed: Apr. 12, 2004

(51) Int. Cl.$^7$ .............................................. B60R 19/42
(52) U.S. Cl. ...................... 293/128; 280/770; 296/207
(58) Field of Search ................................ 293/128, 126; 280/770; 296/207

(56) References Cited

U.S. PATENT DOCUMENTS

| | | | | |
|---|---|---|---|---|
| 2,889,165 A | * | 6/1959 | Zientara | 293/128 |
| 3,882,574 A | * | 5/1975 | Martinez | 293/128 |
| 4,002,363 A | * | 1/1977 | James | 293/128 |
| 4,401,331 A | * | 8/1983 | Ziner et al. | 293/128 |
| 4,879,543 A | * | 11/1989 | Smith, Sr. | 293/128 |
| 5,149,166 A | * | 9/1992 | Wille et al. | 293/128 |
| 5,162,139 A | | 11/1992 | Gomez et al. | |
| 5,184,857 A | | 2/1993 | Hawkins | |
| 5,188,407 A | * | 2/1993 | Villaveces et al. | 293/128 |
| 5,333,923 A | | 8/1994 | Whitfield | |
| 5,421,625 A | | 6/1995 | Arko | |
| 6,186,564 B1 | | 2/2001 | Ashcroft | |
| 6,406,080 B1 | * | 6/2002 | Davis | 293/128 |
| 6,736,435 B1 | * | 5/2004 | Ditthavong | 293/128 |

\* cited by examiner

Primary Examiner—Patricia L. Engle

(57) ABSTRACT

A removable vehicle door protector includes an elongated rod that has a first end and a second end. The rod includes a first section and a second section wherein the first section is removably extendable into the second section so that the rod is selectively telescoping. A first coupler is attached to the first end of the rod for selectively attaching the first end to a first edge of a vehicle door. A second coupler is attached to the second end of the rod for selectively attaching the second end to a second edge of the door so that the rod extends between the first and second edges of the door.

8 Claims, 3 Drawing Sheets

REMOVABLE VEHICLE DOOR PROTECTOR

BACKGROUND OF THE INVENTION

1. Field of the Invention

The present invention relates to door protectors and more particularly pertains to a new door protector for preventing dents to a vehicle door caused by doors of adjacently parked vehicles when the vehicle is parked.

2. Description of the Prior Art

The use of door protectors is known in the prior art. U.S. Pat. No. 5,333,923 describes a device that is attached to the wheel wells of a vehicle so that it extends along the length of the car and thereby protects it from dents. This device is not easily removed and attached and requires brackets to be secured to an inner wall of the wheel wells. Another type of door protector is U.S. Pat. No. 5,162,139 that comprises a plurality of strips that may be positioned on a vehicle along its sides and into locking mechanisms for locking the strips together in a substantially linear orientation. Yet another such device is U.S. Pat. No. 5,184,857 that includes a plurality of bumpers secured together with tethers. The end bumpers have hooks thereon for attaching the bumpers to the wheel wells of the vehicle.

While these devices fulfill their respective, particular objectives and requirements, the need remains for a device that is more simple in its use. Additionally, unlike previous systems and devices, a new device should be utilized which does not risk damaging the paint of a vehicle while it is being attached to and removed from the vehicle.

SUMMARY OF THE INVENTION

The present invention meets the needs presented above by generally comprises an elongated rod that has a first end and a second end. The rod includes a first section and a second section wherein the first section is removably extendable into the second section so that the rod is selectively telescoping. A first coupler is attached to the first end of the rod for selectively attaching the first end to a first edge of a vehicle door. A second coupler is attached to the second end of the rod for selectively attaching the second end to a second edge of the door so that the rod extends between the first and second edges of the door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
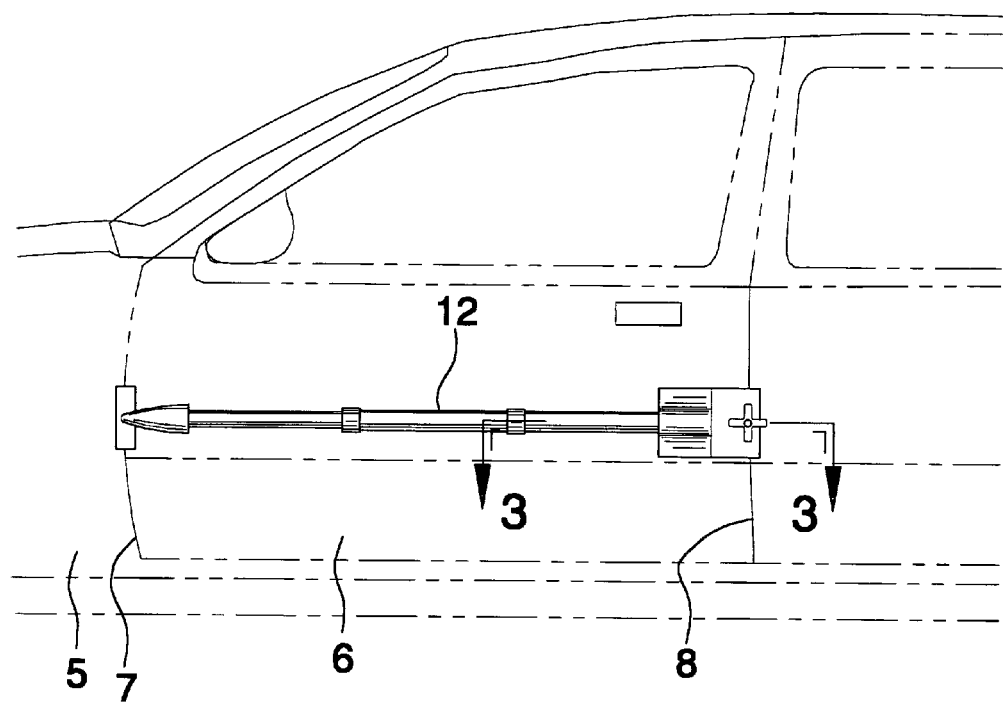
FIG. 1 is a front in-use view of a removable vehicle door protector according to the present invention.
Figure 2:
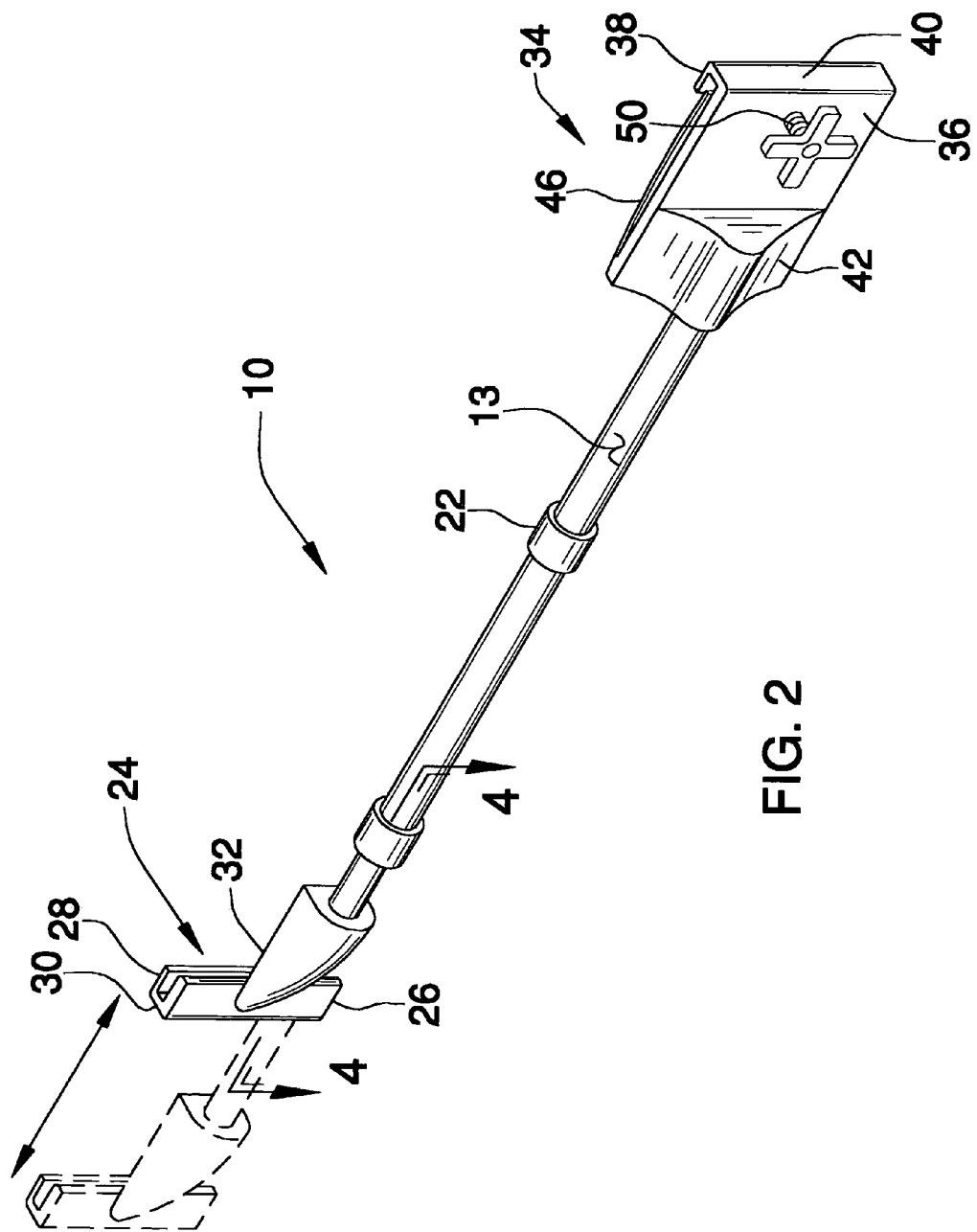
FIG. 2 is a perspective view of the present invention.
Figure 3:
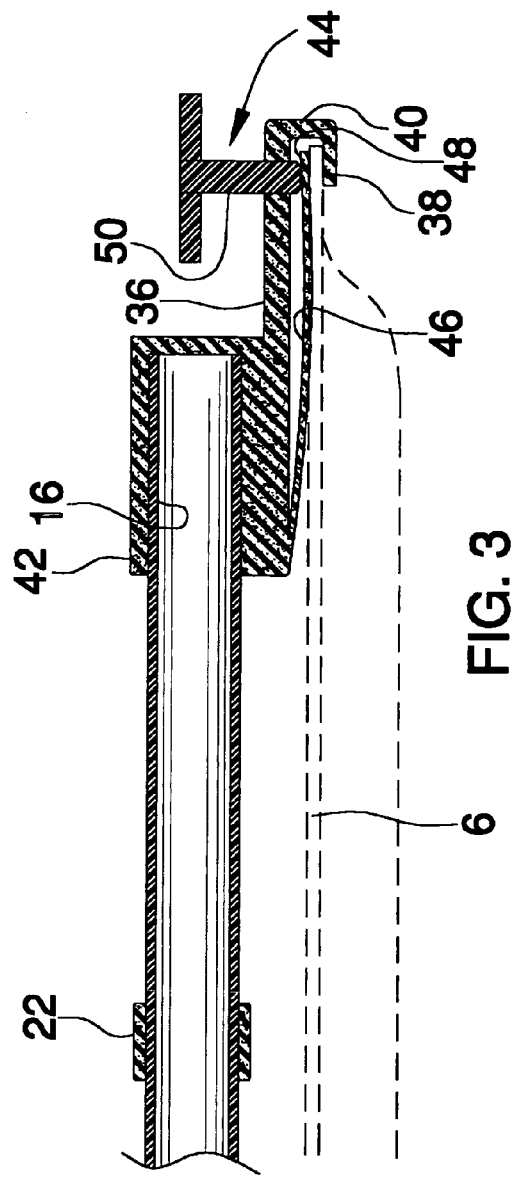
FIG. 3 is a cross-sectional view taken along line 3—3 of FIG. 1 of the present invention.
Figure 4:
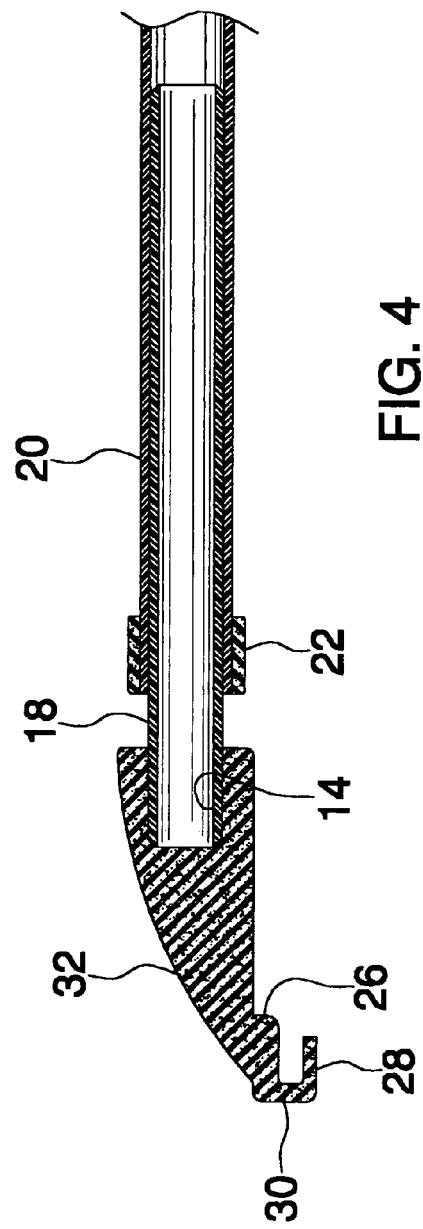
FIG. 4 is a cross-sectional view taken along line 4—4 of FIG. 2 of the present invention.

With reference now to the drawings, and in particular to FIGS. 1 through 4 thereof, a new door protector embodying the principles and concepts of the present invention and generally designated by the reference numeral 10 will be described.

As best illustrated in FIGS. 1 through 4, the removable vehicle door protector 10 generally comprises an elongated rod 12 that has a first end 14 and a second end 16. The rod 12 includes a first section 18 and a second section 20 wherein the first section 18 is removably extendable into the second section 20 such that the rod 12 is selectively telescoping. The rod 12 has a substantially cylindrical cross-section taken perpendicular to a longitudinal axis of the rod. Each of a plurality of elastomeric bands 22 is positioned on and extends around the rod 12. The bands 22 protect a door 6 of a vehicle 5 when the rod 12 is positioned against the door 6.

A first coupler 24 is attached to the first end 14 of the rod 12 for selectively attaching the first end 14 to a first edge 7 of the door 6. The first coupler 24 includes a first leg 26, a second leg 28 and a central portion 30 attached to each of the first 26 and second 28 legs such that the first 26 and second 28 legs each extend in generally the same direction with respect to each other. The first edge 7 of a vehicle door 6 is selectively positioned between sad first 26 and second 28 legs. A post 32 is attached to the first leg 26. The post 32 extends in the same direction as the first leg 26. The post 32 is attached to the first end 14 of the rod 12 such that the first 26 and second 28 legs extend toward, or in the direction of, the second end 16 of the rod 12. The first coupler 24 preferably comprises an elastomeric material though a plastic material may be used as well. A distance from the longitudinal axis of the rod 12 to an outer surface 13 of the rod 12 is less than a distance from the longitudinal axis to the first leg 26. This ensures that the rod 12 does not touch the door 6 when the first coupler 24 is positioned on the first edge 7.

A second coupler 34 is attached to the second end 16 of the rod 12 for selectively attaching the second end 16 to a second edge 8 of the door 6 such that the rod 12 extends between the first 7 and second 8 edges of the door 6. The second coupler 34 includes a first arm 36, a second arm 38 and a middle section 40 attached to each of the first 36 and second 38 arms such that the first 36 and second 38 arms extend in generally the same section with respect to each other. The second edge 8 of the door 6 is selectively positioned between the first 36 and second 38 arms. A sleeve 42 is attached to and extends in the same direction as the first arm 36. The second end 16 of the rod 12 extends into and is attached to the sleeve 42 such that the first arm 36 extends toward and is aligned with the first leg 26. Alternatively, both the sleeve 42 and the post 32 may be integral with the rod 12. The second coupler 34 preferably comprises an elastomeric material, though again plastic may be utilized. The elastomeric material may include foamed elastomers as well. The distance from the longitudinal axis of the rod 12 to the outer surface 13 of the rod 12 is less than a distance from the longitudinal axis to the first arm 36 for the same reasons as mentioned previously.

A biasing member 44 is mounted on the second coupler 34 for selectively biasing the door 6 away from the first arm 36 and toward the second arm 38. The biasing member 44 includes a panel 46 that is attached to the sleeve 42 and has a free end 48 positioned between the first 36 and second 38 arms. A threaded rod 50 is threadably coupled to and extends through the first arm 36 and toward the second arm 38. The threaded arm 50 abuts the panel 46. The rod 50 may be moved toward the second arm 38 such that the door 6 is releasably secured between the panel 46 and the second arm 38.

In use, the rod 12 is lengthened to its required length and is attached to the vehicle door 6 using the first coupler 24 and second coupler 34 as shown in FIG. 1. The rod 12 is positioned generally between the window and a bottom edge of the door 6. The rod 12 protects the door 6 from other doors which are opened adjacent to the vehicle 5. Adjacent doors will strike the rod 12 instead of the door 6 and the door 6 will not be damaged. By using a simple biasing member 44, the protector 10 is easily placed onto or removed from the door 6.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dent-preventing device adapted for being removably positioned on a vehicle door, said device comprising:

an elongated rod having a first end and a second end, said rod including a first section and a second section wherein said first section is removably extendable into said second section such that said rod is selectively telescoping;

a first coupler being attached to said first end of said rod for selectively attaching said first end to a first edge of the door, said first coupler including a first leg, a second leg and a central portion attached to each of said first and second legs such that said first and second legs extend in generally the same direction with respect to each other, the first edge being selectively positioned between sad first and second legs, a post being attached to said first leg, said post extending in the same direction as said first leg, said post being attached to said first end of said rod such that said first and second legs extend toward said second end of said rod;

a second coupler being attached to said second end of said rod for selectively attaching said second end to a second edge of the door such that said rod extends between the first and second edges of the door, said second coupler including a first and a second arm and a middle section attached to each of said first and second arms such that said first and second arms extend in generally the same direction with respect to each other, the second edge being selectively positioned between said first and second arms, a sleeve being attached to and extending in the same direction as said first arm, said second end of said rod extending into and being attached to said sleeve such that said first arm extends toward and is aligned with said first leg; and a biasing member being mounted on said second coupler for selectively biasing the door away from said first arm and toward said second arm.

2. The device according to claim 1, wherein said first coupler comprises an elastomeric material.

3. The device according to claim 2, wherein a distance from a longitudinal axis of said rod to an outer surface of said rod being less than a distance from the longitudinal axis to said first leg.

4. The device according to claim 1, wherein a distance from a longitudinal axis of said rod to an outer surface of said rod being less than a distance from said longitudinal axis to said first leg.

5. The device according to claim 1, wherein said biasing member includes a panel being attached to said sleeve and having a free end positioned between said first and second arms, a threaded rod being threadably coupled to and extending through said first arm and toward said second arm, said threaded arm abutting said panel, wherein said rod may be moved toward said second arm such that the door is releasably secured between said panel and said second arm.

6. The device according to claim 1, further including a plurality of elastomeric bands being positioned on and extending around said rod.

7. A dent-preventing device adapted for being removably positioned on a vehicle door, said device comprising:

an elongated rod having a first end and a second end, said rod including a first section and a second section wherein said first section is removably extendable into said second section such that said rod is selectively telescoping, said rod having a substantially cylindrical cross-section taken perpendicular to a longitudinal axis of said rod;

a first coupler being attached to said first end of said rod for selectively attaching said first end to a first edge of the door, said first coupler including a first leg, a second leg and a central portion attached to each of said first and second legs such that said first and second legs extend in generally the same direction with respect to each other, the first edge being selectively positioned between sad first and second legs, a post being attached to said first leg, said post extending in the same direction as said first leg, said post being attached to said first end of said rod such that said first and second legs extend toward said second end of said rod, said first coupler comprising an elastomeric material, a distance from said longitudinal axis of said rod to an outer surface of said rod being less than a distance from said longitudinal axis to said first leg;

a second coupler being attached to said second end of said rod for selectively attaching said second end to a second edge of the door such that said rod extends between the first and second edges of the door, said second coupler including a first arm, a second arm and a middle section attached to each of said first and second arms such that said first and second arms extend in generally the same direction with respect to each other, the second edge being selectively positioned between said first and second arms, a sleeve being attached to and extending in the same direction as said first arm, said second end of said rod extending into and being attached to said sleeve such that said first arm extends toward and is aligned with said first leg, said second coupler comprising an elastomeric material, the distance from said longitudinal axis of said rod to said outer surface of said rod being less than a distance from said longitudinal axis to said first arm;

a biasing member being mounted on said second coupler for selectively biasing the door away from said first arm and toward said second arm, said biasing member including a panel being attached to said sleeve and having a free end positioned between said first and second arms, a threaded rod being threadably coupled to and extending through said first arm and toward said second arm, said threaded arm abutting said panel, wherein said rod may be moved toward said second arm such that the door is releasably secured between said panel and said second arm; and a plurality of elastomeric bands being positioned on and extending around said rod.

8. A dent-preventing device adapted for being removably positioned on a vehicle door, said device comprising:

an elongated rod having a first end and a second end, said rod including a first section and a second section wherein said first section is removably extendable into said second section such that said rod is selectively telescoping;

a first coupler being attached to said first end of said rod for selectively attaching said first end to a first edge of the door;

a second coupler being attached to said second end of said rod for selectively attaching said second end to a second edge of the door such that said rod extends between the first and second edges of the door, said second coupler including a first arm, a second arm and a middle section attached to each of said first and second arms such that said first and second arms extend in generally the same direction with respect to each other, the second edge being selectively positioned between said first and second arms; and a biasing member being mounted on said second coupler for selectively biasing the door away from said first arm and toward said second arm.

* * * * *